UNITED STATES PATENT OFFICE.

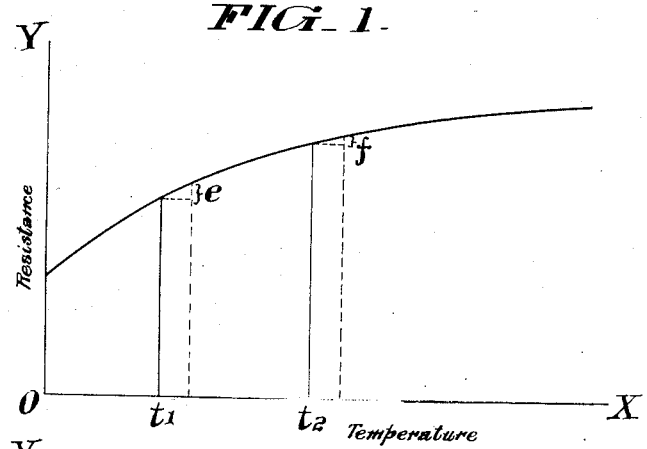
FIG. 1.
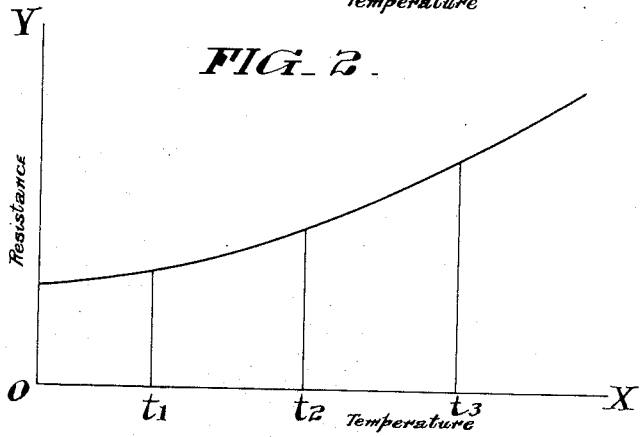
FIG. 2.
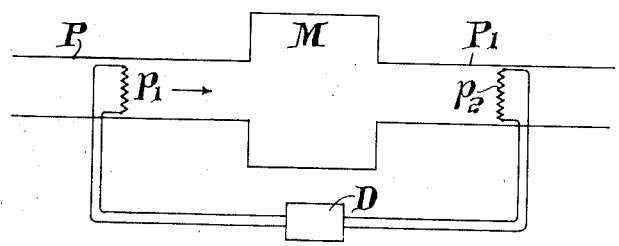
FIG. 3.
FIG. 4.

MORRIS E. LEEDS, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

COMPOSITE RESISTANCE.

1,192,911.     Specification of Letters Patent.     Patented Aug. 1, 1916.

Application filed April 8, 1916. Serial No. 89,858.

*To all whom it may concern:*

Be it known that I, MORRIS E. LEEDS, a citizen of the United States, residing in the city of Philadelphia, county of Philadelphia, and State of Pennsylvania, have invented a new and useful Composite Resistance, of which the following is a specification.

It is the object of my invention to provide a resistance which shall exhibit equal increments of resistance change for equal increments of temperature change. Such a resistance is particularly suitable for resistance thermometry, temperature measurement, and for use in analogous relation and those relations in which such a property is desirable. To these ends I employ a composite resistance each of whose components changes in resistance disproportionately to temperature changes; and different components change in resistance with respect to temperature at different rates or according to different laws. And I connect in series with each other such quantities of the components that they shall co-act in such manner that their combined resistance changes proportionately with temperature changes.

For an understanding and illustration of my invention reference may be had to the accompanying drawing, in which:

Figure 1 is a graphic representation of the relations between resistance and temperature of a resistance material. Fig. 2 is a graphic representation of relations between resistance and temperature of a different material. Fig. 3 is a diagrammatic illustration of an application of resistance thermometers. Fig. 4 is an illustration of a composite resistance.

It is well known that the relation between resistance and temperature for metals may be represented by a curve of the character illustrated in Fig. 1, where the ordinates or heights measured parallel to the axis of OY represent resistances and abscissæ, or distances measured parellel to the axis OX, represent temperatures. For practically all pure metals and for most alloys the relation between resistance and temperature is graphically represented by a curve, because the resistance does not change directly proportionately to the temperature, that is, the graphic representation is not a straight line which represents strict proportionality. It is accordingly true that for a given temperature difference or change at one part of the range the resistance change will not be the same as the resistance change for an equal change of temperature at another part of the range. For example, for a given temperature change from the temperature $t^1$, Fig. 1, there is a corresponding resistance change $e$ which is greater than the resistance change $f$ due to an equal temperature change from temperature $t^2$. This characteristic of a resistance material introduces difficulties in its use as the resistance of a resistance thermometer or other temperature measuring apparatus; and these difficulties would be obviated if the resistance temperature relation were rectilinear. These difficulties are particularly great where two resistance thermometers, as indicated at $p^1$ and $p^2$, Fig. 3, are used to determine the difference in temperature between a gas or fluid as it passes in the direction of the arrow from the pipe P into the tank or chamber M and as it leaves the same by the pipe $P^1$. For this purpose the two thermometers $p^1$, $p^2$ would be made to have exactly the same resistance at a given temperature and would be connected to any instrument for reading or recording the difference of their resistances, such an instrument being indicated at D. From the resistance-temperature characteristic of a metal as illustrated, for example, in Fig. 1, it follows that while the instrument D could be used to determine the difference between the resistances of the two thermometers $p^1$ and $p^2$, it could only be used to determine the difference between the temperature of these two thermometers if the actual temperature of one of them were known as well as their difference in resistance.

In practice it seldom happens that the temperature of the ingoing fluid, gas or liquid is constant and it is inconvenient to measure the temperature of the ingoing gas or liquid and from it determine the necessary corrections on the differential indicator or recorder D. It is therefore desirable, particularly in an arrangement illustrated by Fig. 3, and in many other relations, to have and employ a resistance which shall exhibit a resistance change which is proportional to the temperature change causing that resistance change.

While for some pure metals, including platinum, the curvature is convex upwardly as illustrated in Fig. 1, there is nickel, for which the curvature is convex downwardly as illustrated in Fig. 2. I have found that by combining two metals, one having the general characteristic of the kind represented by Fig. 1 and the other represented by Fig. 2, when used in proper proportions, it is possible to produce a composite resistance exhibiting a substantially rectilinear relation between temperature and resistance changes, particularly throughout a predetermined temperature range in the case of nickel.

It will be understood that neither Fig. 1 nor Fig. 2 accurately represents the characteristics of any material, these figures being exemplary only of the fact that the characteristics of some metals are represented by a curve convex upwardly and in another case by a curve convex downwardly. Both curves, however, refer to metals or materials having similar, i. e. positive, temperature co-efficients, since in both Fig. 1 and Fig. 2 the resistance increases with increase in temperature. But in neither case is the temperature co-efficient constant, and the two curves differ from each other as to the manner in which their temperature co-efficients vary.

The relation between resistance and temperature of a metal, such as platinum, whose curve is of the general character represented in Fig. 1 may be represented by the algebraic equation:

$$R_t = R_o(1 + At - Bt^2) \quad (1)$$

where $R_t$ is the resistance at any temperature $t$; $R_o$ is the resistance at zero; and $A$ and $B$ are constants for the particular material involved. And the relation between resistance and temperature for a material having a characteristic of the general character referred to in connection with Fig. 2, may be represented by the formula:

$$r_t = r_o(1 + at + bt^2) \quad (2)$$

in which $r_t$ is the resistance at any temperature $t$; $r_o$ is the resistance at zero; and $a$ and $b$ are constants for the particular material involved.

I have found that combining metals or materials having the characteristics represented by equations (1) and (2) will provide a composite resistance of rectilinear relation between resistance and temperature when in the proportions represented by the construction obtained by equating the third terms of equations (1) and (2) as follows:

$$r_o b t^2 = R_o B t^2 \quad (3)$$

from which:

$$\frac{r_o}{R_o} = \frac{B}{b} \quad (4)$$

which gives the quantity of metal, represented by $r_o$ to be used in terms of the quantity of platinum, for example, represented by $R_o$, and the co-efficients or constants $b$ and $B$ of the two materials. The complete equation of the combination of the two materials, connected in series with each other, so that their resistances are added, will be:

$$R_t + r_t = R_o + r_o + R_o A t + r_o a t \quad (5)$$

This may be simplified by making $$R_t + r_t = W_t$$
$$R_o + r_o = W_o$$
$$\frac{AR_o}{W_o} + \frac{ar_o}{W_o} = m$$

in which $W_o$ and $W_t$ represent respectively the resistances of the composite resistance at zero and temperature $t$. The equation for the composite resistance then becomes:

$$W_t = W_o(1 + mt) \quad (6)$$

The equation (6) is a first power equation and therefore is a rectilinear function between resistance and temperature, which is the desideratum of the composite resistance whose proportions are expressed by the ratio of the constant B to the constant b of equation (4).

Since the curve for nickel cannot be strictly represented by an equation of three terms, such as equation (2), but must have a fourth term as in the following equation:

$$r_t = r_o(1 + at + bt^2 - ct^3) \quad (7),$$

the foregoing method will not produce a composite resistance with a rigidly straight line characteristic, but it will greatly improve either nickel or platinum taken alone, and for small ranges a composite resistance so produced will have a resistance-temperature characteristic which will scarcely be distinguishable from a straight line.

The co-efficients $a$, $b$ and $A$, $B$ of the foregoing equations (1) and (2) are obtained by experiment or measurement. For example, in determining the constants or co-efficients $a$ and $b$ of nickel used for the composite resistance, measurements of the resistance at three different temperatures are taken, two of the temperatures $t^1$ and $t^3$, Fig. 2, being at the two extremes of the range over which the composite resistance is to be used and the third temperature $t^2$ at the middle of the range. From these three resistance measurements, the co-efficients being the same at all temperatures, three equations are available of the character represented by equation (2) from which the co-efficients or constants are solved; then by recourse to equation (4) the correct amount of nickel necessary to produce a composite resistance having a substantially rectilinear function is computable. In the way above described the co-efficients A and B are obtained for a metal whose resistance-temperature curve is of the type illustrated in Fig. 1. Fig. 4 is illustrative merely, and does not accurately represent the quantities of resistances employed in such a composite resistance. This figure represents merely two different materials as Pt, platinum, and Ni, nickel, connected in series with each other. With two such composite resistances used at $p^1$ and $p^2$, Fig. 3, and making them equal in resistance at a given temperature, the differences between the resistances of $p^1$ and $p^2$ for different temperatures of the ingoing or outgoing fluid or other material will be proportional to the differences in these temperatures, and therefore the instrument D will indicate or record directly and correctly the loss or change in temperature of the fluid.

What I claim is:

1. A composite resistance having a temperature co-efficient which is substantially constant, comprising components having similar but differently varying temperature co-efficients.

2. A composite resistance having a positive temperature co-efficient which is substantially constant, comprising components having positive temperature co-efficients which vary differently.

3. A composite resistance having a temperature co-efficient which is substantially constant, comprising components whose resistances vary with temperature as expressed respectively by equations (1) and (2) herein, and present in proportions expressed by the ratio of the co-efficients B and $b$ of said equations.

4. A composite resistance comprising platinum and nickel in such proportions that it exhibits a temperature co-efficient which is substantially constant through a predetermined temperature range.

5. A composite resistance comprising component resistances exhibiting respectively progressively smaller and greater increases in resistances with increases in temperature and in such proportions that they jointly exhibit a resistance increase directly proportional to temperature increase.

In testimony whereof I have hereunto affixed my signature this 4th day of April, 1916.

MORRIS E. LEEDS.